United States Patent [19]

Kemp

[11] 4,193,577
[45] Mar. 18, 1980

[54] EXPANDING GATE VALVE WITH AXIALLY FLEXED SPRING PLATE

[75] Inventor: Willard E. Kemp, Houston, Tex.

[73] Assignee: ACF Industries, Incorporated, New York, N.Y.

[21] Appl. No.: 949,844

[22] Filed: Oct. 10, 1978

[51] Int. Cl.² ........................................... F16K 25/00
[52] U.S. Cl. .................................... 251/167; 251/196
[58] Field of Search ............... 251/167, 196, 195, 199

[56] References Cited

U.S. PATENT DOCUMENTS

| | | | |
|---|---|---|---|
| 2,954,960 | 10/1960 | Dunbar | 251/196 |
| 3,823,911 | 7/1974 | Natho | 251/167 |

Primary Examiner—Harold W. Weakley
Attorney, Agent, or Firm—Eugene N. Riddle

[57] ABSTRACT

An improved spring plate (52) for insuring timely cooperation between the gate member (36) and segment member (38) of a linearly reciprocating gate assembly (34) which is expansible to seal the opposed seats of a gate valve. The two members have two pairs of interfacing wedge surfaces which should be in full contact when the assembly is traveling between the extremities of its stroke. Only at the ends of such stroke, as determined by a stop which halts movement of the segment member, should wedging and transverse expansion take place.

The spring plate (52) has the general shape of an inverted "T" plus a pair of curved spring fingers (60, 62) extending from the free top end of the upright leg (54) toward the opposite ends of the assembly. The base legs (56,58) of the inverted "T" pass under the two pins (72, 74) in the gate member, which are located at equal distances from the mid-length of the gate member. Each spring finger curves toward the end of the assembly and downwardly toward the base legs, but terminates short of them with a free end. As the plate is installed, these free ends are flexed so that they contact and are held by the gate pins, the tangent through the contact point being approximately normal to the direction of movement of the assembly.

10 Claims, 3 Drawing Figures

EXPANDING GATE VALVE WITH AXIALLY FLEXED SPRING PLATE

FIELD OF INVENTION

The present invention is concerned with gate valves of the type wherein a two-part gate assembly is transversely expansible at each end of its rectilinear stroke, and is collapsible to a smaller thickness during such stroke. More particularly, the invention lies in improved means for so interconnecting the two parts of the gate assembly as to insure their expansion only at the desired times.

PRIOR ART

Double acting expanding gate valves have been used for many years, and for the most part serve admirably their intended functions. The gate assembly in transit is simply a rectangular parallelepiped which is pushed or pulled through its linear track by a valve stem, and its working surfaces are a pair of parallel outside surfaces coplanar with and lying adjacent the valve seats. The two parts, commonly called the gate and segment, are actually separate members secured together by means which must permit some relative movement when the segment member, which extends beyond the gate at each end, encounters a stop. Such relative movement is made possible by the fact that only the gate member is attached to the operating stem, the segment being carried by the gate, and by the fact that the two members interface in a pair of diverging wedge surfaces extending from about the midlength of each member through both of its ends. Thus the gate member presents a planar concavity to the segment member, and the latter has a matching convexity. When the protruding end of the segment member encounters a fixed stop but continued force is exerted on the gate, one pair of matching wedge surfaces slide relative to each other while a gap appears between the other two wedge surfaces. This causes an increase in thickness of the assembly, bringing their outer flat surfaces into contact with the valve seats and providing a tight seal against them.

It has always been the aim of those engineers concerned with improving the operation of such valves to design better means for holding the two members of the assembly together. The problem has two aspects, for the securing means must not only hold gate and segment in gapless relationship during travel, and in such manner as not to interfere with expansion at the end of a stroke, but must permit ready collapse from the expanded position at the start of a reverse stroke.

Prior designers have experimented with many and varied connecting means. One of the most successful is the ox yoke spring exemplified in Dunbar and Sanders, U.S. Pat. No. 2,954,960. More complicated but springless means are disclosed by Laurent in U.S. Pat. No. 2,583,512.

While the ox yoke spring has served admirably, and indeed is still standard in the industry, it does have its disadvantages. One of its principal drawbacks lies in its disposition, extending in an undulating but almost straight line parallel to the track of the gate assembly so that it passes over a center pin in the segment and has its two ends tucked under a pair of opposed pins in the gate member. With such disposition, all forces passing between the spring and its pins are perpendicular to the direction of forces transmitted through the valve stem. Such forces do not assist the valve stem, as they would if they could be directed parallel to the stem.

SHORT STATEMENT OF THE INVENTION

The present inventor determined on a design to overcome the disadvantages of the ox yoke spring. At the same time, his object was to minimize the production cost in switching to his alternate structure, principally by making no other change than substituting his new invention for the ox yoke spring. The same pins are employed, and in the same location. Such a change has the additional advantage that field retrofitting is possible, and at a minimum cost.

These objects are attained according to the present invention by providing a spring plate in the general shape of an inverted "T", i.e., having a center leg extending uprightly from the center of a base member elongated in the direction of travel of the gate assembly, together with a pair of curved spring fingers extending in opposite directions from the top of the upright center portion. Such center portion is pinned to the center of the segment member and each end of the elongated base passes under and contacts the lower part of the adjacent pin protruding from the gate member. In assembling the parts, these ends of the base members are slightly flexed to insure a tight assembly, and then are further flexed when the assembly is expanded to raise the center pin in the segment member relative to the opposed pair of gate pins, which are spaced the same distance from the center pin on opposite sides thereof. Thus the two parts of the base leg are actually an additional pair of spring fingers, and furnish a transverse restorative force when the assembly is to be collapsed from sealing position to traveling position.

Each of the spring fingers extends along its curved path toward one end of the gate assembly and downwardly toward the base finger of the spring plate. Here it stops short of contacting such base finger, and terminates in a free end. When the spring plate is assembled with the gate assembly, each spring finger is flexed toward the center of the plate and is held under such flexure by contact with the inside surface of the adjacent gate pin. The point of contact has a tangent which is nearly perpendicular to the line of travel, thus insuring a direct transmission of force to the spring finger when a force exerted linearly through the valve stem causes further movement of the gate section after the segment member is stopped, at the end of a stroke. (The other spring finger will, of course, be correspondingly relaxed.) The flexed spring will exert a restorative force against the pin, ready to assist in collapsing the assembly when a reverse stroke is initiated.

SHORT DESCRIPTION OF THE DRAWING FIGURES

The present invention will be more readily understood by reference to the accompanying drawing forming a part of the present application. In the drawing.

DETAILED DESCRIPTION OF THE DRAWING FIGURES

Figure 1:
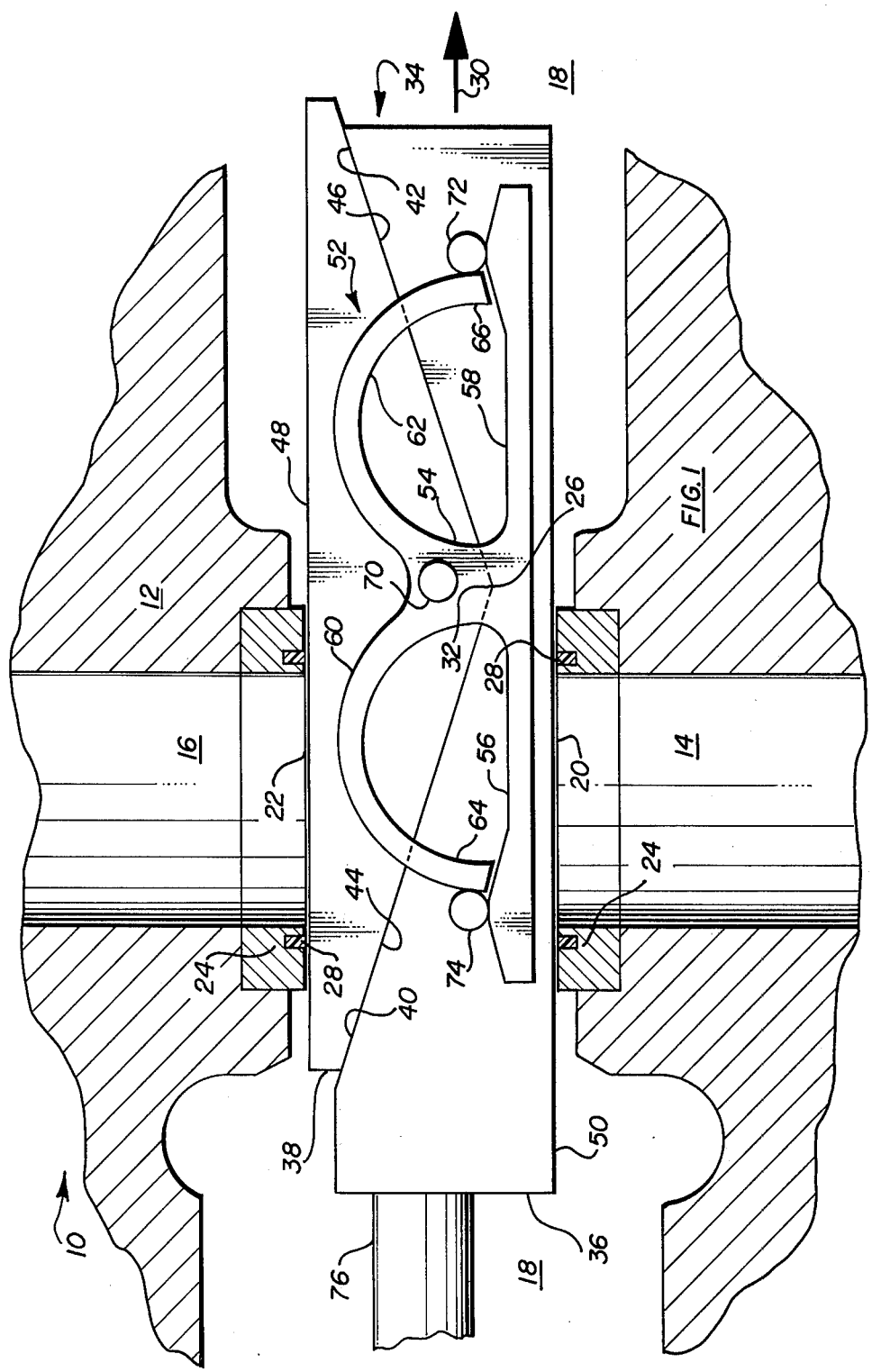
FIG. 1 is a longitudinal section through a gate valve showing the gate assembly with a spring plate of the invention, all parts being shown in the collapsed or traveling relationship of the assembly.
Figure 2:
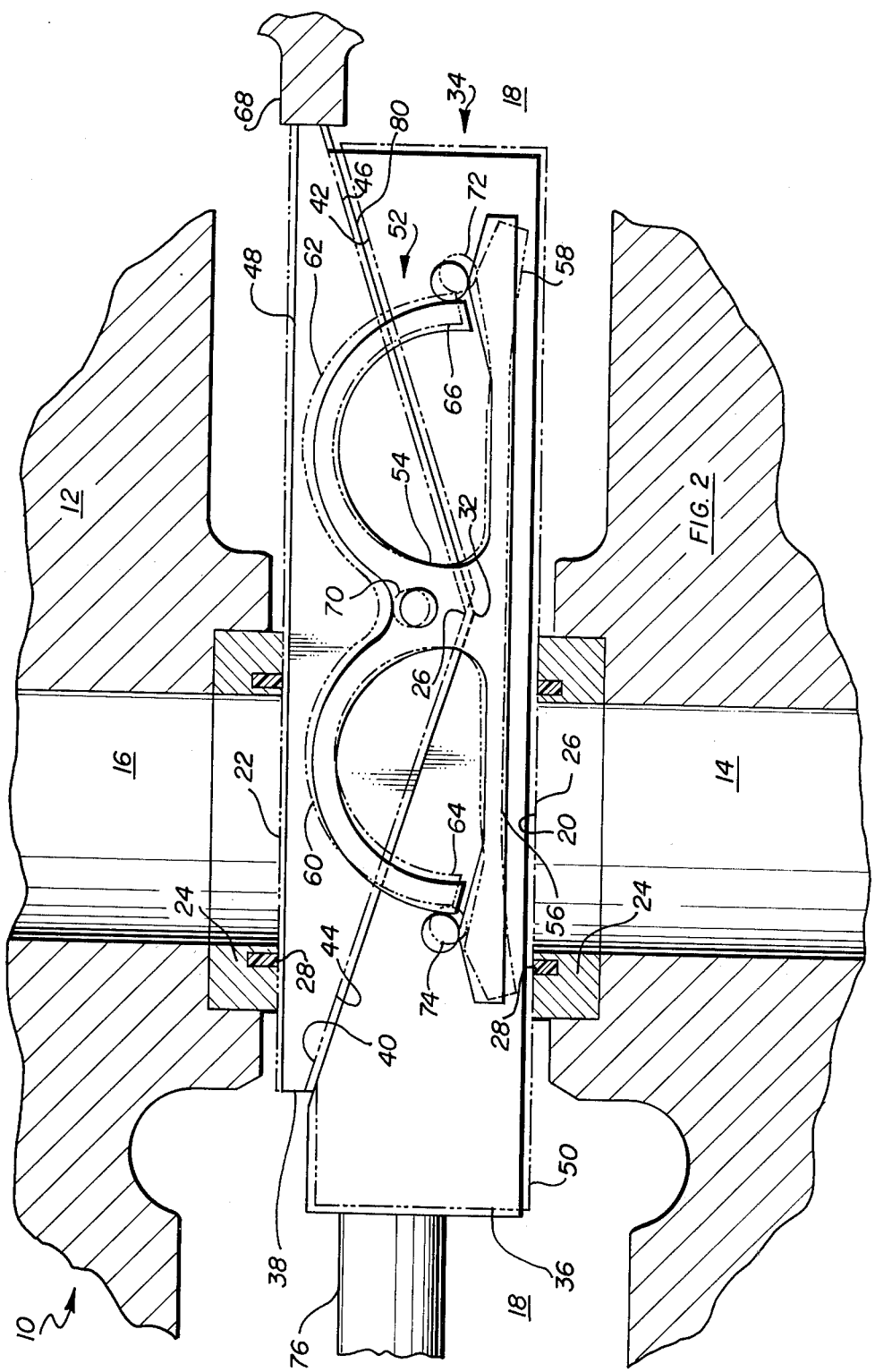
FIG. 2 is a similar section showing the same assembly at the end of a stroke, the parts shown in solid outline in their expanded condition and in collapsed relationship in phantom outline.
Figure 3:
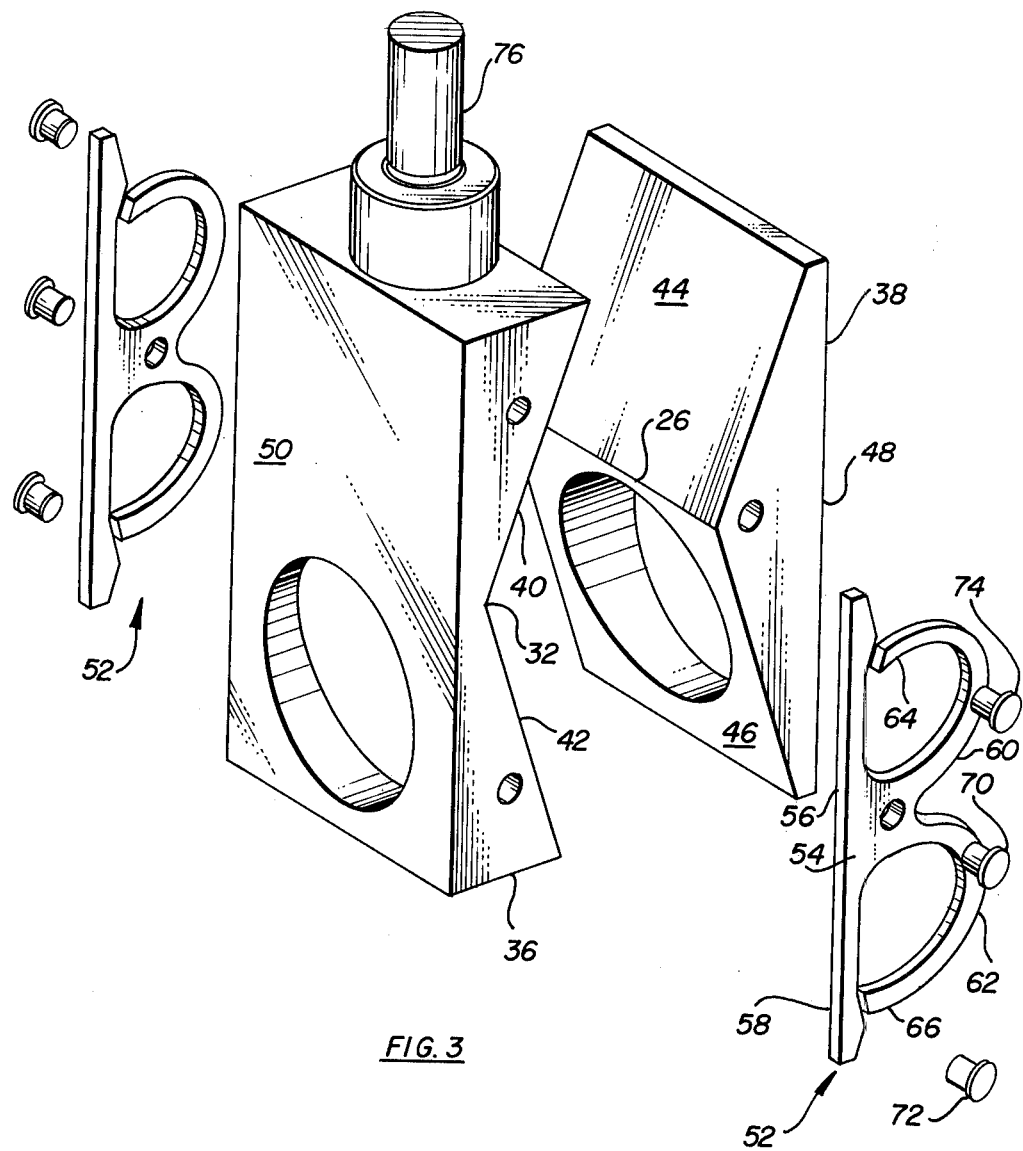
FIG. 3 is an exploded view of a gate assembly consisting of the same parts as shown in the same figures.

In FIGS. 1 and 2, only those parts of the housing lying in the immediate vicinity of the gate assembly are shown. Also omitted for clarity are the pair of opposed skirts secured to the housing on opposed sides of the gate assembly and furnishing guides for the moving gate. These form no part of the invention, and it is enough to observe that they are conventional in all respects.

The gate valve 10 comprises a housing 12 having a fluid passageway 14, 16 therethrough which is interrupted by a valve operating chamber 18 intersecting it at right angles to define lower port 20 and upper port 22. At each such port, the passageway is counterbored as indicated to receive the replaceable seats 24. Seats 24 have resilient seal rings 28 which form sealing surfaces.

The gate assembly 34 is shown in FIG. 1 in collapsed condition, wherein the thickness measured normally between the flat upper sealing surface 48 of segment 38 and the parallel lower sealing surface 50 of gate 36 is at a minimum. Seal rings 28 are adapted to engage sealing surfaces 48 and 50. In the collapsed condition, the left wedging surface 40 of gate 36 is pressed tightly against the parallel wedging surface 44 of segment 38, and similarly, their right wedging surfaces 42 and 46 are tightly pressed together. In such condition, there is a gap as shown between each sealing surface 48, 50 and the sealing surfaces 28 of seats 24 for operating clearance.

The spring plate 52 of the invention has the general form of an inverted "T", i.e., comprising a center leg or post 54 extending upwardly from the center of base legs 56, 58 where the equal length portions 56, 58 extend parallel to the stroke direction of the assembly, as indicated by the arrow 30 in FIG. 1. This shape is modified by the upper pair of curved spring fingers 60, 62 which extend from the top of the center post 54 of the plate and extend in opposite directions towards the ends of the assembly, each at the same time curving downward toward the base leg but stopping short thereof and terminating in free ends, the left spring finger 60 in free end 64 and the right finger 62 in free end 66.

The spring plate 52 interconnects segment 38 and gate 36 first by the connecting member 70 passing through a hole in the center of the central portion 54 and rigidly secured in a registering opening in segment 38, directly over the apex 26 where wedge surfaces 44 and 46 intersect. Base legs 56 and 58 extend in opposite directions from center portion 54 toward the ends of the assembly and are slightly flexed downwardly to underlie and forcibly contact the lower edges of a pair of pins 72, 74 fixed in and protruding from the line of intersection 32 of its wedge surfaces 40 and 42. Base legs 56 and 58 are actually a second pair of spring fingers, and spring plate 52 may also be said to have the general form of an "H" rotated 90 degrees to lie on one of its double arms, modified so that its upper double arm is curved so that each half-arm is curved downwardly to form a curved spring finger 60 or 62.

In assembling spring plate 52 to the members 36, 38 of the gate assembly, each free end 64, 66 of the spring fingers is bent or flexed inwardly toward the center post 54 until it can be released to spring back and forcibly contact pin 72 or 74 on its inner surface, facing toward center post 54. It will be noted that the line of contact of the two members has a tangent very nearly perpendicular to the stroke direction 30 and thus to the direction in which force is transmitted to the assembly through the stem 76. Any such force thus applied to gate 56 after segment 38 is stopped will have a maximum effect in further flexing one of the spring arms 60, 62.

FIG. 2 shows the positions of the parts at the end of the second of two occurrences which have occurred after the time of FIG. 1. The segment member 38 has been moved to the right until it contacts stop 68, bringing this member to a complete halt. Thereafter continued force has been exerted to the right on gate 36, causing left wedge surface 40 of the gate 36 to slide along left wedge surface 44 of gate 38 and causing their right wedge surfaces 42, 46 to separate by the gap 80. The wedging action cams segment 38 upwardly and gate 36 downwardly into tight sealing contact with the opposed seats 24 (or their outer surfaces 28), whether this be for flow through ports 20, 22 and aligned openings in gate and segment or for flow blockage by confronting the ports with solid portions of the sealing surfaces 48 and 50.

As the wedging and expansion is taking place, pins 72 and 74 move in two directions relative to center pin 70. One movement is to the right; since center pin 70 does not move in the stroke direction, the distance between it and left gate pin 74 decreases, flexing left spring finger 60 toward center post 54 and relaxing the right spring finger 62 by the opposite mechanism. The other movement is transverse, i.e., parallel to the flow direction through fluid passageway 14, 16, as center pin 70 is moved upwardly with segment 38 while pins 72, 74 move downwardly with gate 36. This movement flexes both of the opposed ends of the lower pair of spring fingers 56, 58 downwardly as indicated. Such flexure sets up a restoring force tending to return the members 36, 38 to their collapsed position. Such collapse will occur as soon as the thrust on gate 36 is relaxed in preparation for a reverse stroke.

It will be apparent to the reader that the reverse movement, i.e., to the left in FIGS. 1 and 2, will be identical to the rightward movement described above. At the end of the lefthand stroke, when segment 38 is halted and gate 36 continues, wedging and expansion will again occur, this time by camming action between the right hand matching wedging surfaces 42, 46, the gap this time appearing between 40 and 44. The action of the spring fingers will be the same except that finger 62 will be deeply flexed while finger 60 is relaxed.

Having read this description of a preferred embodiment and its mode of operation, the reader of average skill in the art will readily think of many modifications which have not been described. Such modifications are deemed to be within the scope of the invention, as are all substantially similar means operating in substantially the same manner to achieve approximately the same results.

What is claimed is:

1. In a gate valve of the type wherein a gate assembly is linearly reciprocable between open and closed positions at the ends of its strokes and in each such end position is transversely expandable to seal a pair of opposed seats of a fluid passageway interrupted by a valve operating chamber in which such gate assembly is disposed and operates, such gate assembly consisting of a gate member and a segment member which nest together to form a rectangular block having opposed and parallel outside sealing surfaces facing said opposed seats, the gate and segment members having interfacing complementary inner wedging surfaces effectively operable upon a relative displacement between such members in the direction of travel of the assembly to expand the assembly against the seats, the improvement comprising a spring plate secured to one of the side surfaces of said gate and segment members, said spring plate having a central body portion rigidly secured to the segment member at its midlength, an elongated base member extending in both directions from the bottom of said center body portion and passing under a pair of opposed pins secured to said gate member and disposed at equal distances from its midlength point, and a pair of curved spring fingers extending in opposite lengthwise directions from the top of said center body portion and curving toward said pair of pins in the gate member and terminating in free ends, said free ends being flexed toward the center body portion of the spring plate and held in flexure against said pins, one of said spring fingers being further flexed when the wedging expansion of the gate assembly decreases the spacing between said midlength of the segment and the gate pin against which said finger is initially flexed.

2. A gate valve comprising:

a housing forming a valve chamber having a pair of aligned ports with opposed parallel seats;

a gate valve assembly mounted for linear movement between said seats in opposed directions parallel to said seats to open and close valve positions, said assembly being expansible normal to said direction to contact and seal against said opposed seats;

the gate valve assembly comprising two ported abutting members having an elongated length along said directions of movement, a pair of parallel and opposed lateral outer sealing surfaces to engage said seats, a pair of opposed outer edge surfaces extending generally normally between said sealing surfaces, and complementary interfacing inner faces each formed with a pair of surfaces that diverge transversely from a common apex at about the center of said members towards the ends thereof to form two pairs of inerfacing wedge surfaces operably effective to expand said members toward said seats upon relative lengthwise displacement between the two members from a starting position in which said apices are coincident and both of said wedge surfaces of one member are in full contact with the complementary interfacing wedge surfaces of the other;

means for moving said gate valve assembly linearly between the opposed ends of its strokes, corresponding to open and closed positions of the valve;

means for defining said ends of the stroke of the assembly by providing a stop for one member of such assembly but not the other; and means for interconnecting the two members of the assembly to prevent wedging and expansion action during strokes thereof while permitting the same at the stroke ends, said last means comprising:

at least one spring plate secured to one of the edge surfaces of the two members and a pair of pins secured in and projecting from said edge surface of one member at equal lengthwise distances from its apex;

the spring plate having a center portion extending generally in a direction between said sealing surfaces but terminating short of the sealing surface of said one member in a bottom and short of the sealing surface of the other in a top, said center portion being rigidly secured to the other member, said spring including a pair of straight spring fingers integral with the center portion and extending along both said directions of movement from the bottom of the center portion to underlie and contact said pair of pins, and said spring plate including a pair of curved spring fingers integral with the center portion and extending in opposed lengthwise directions and each extending toward said straight spring fingers but stopping short thereof with a free end, each said free end being flexed in assembly toward said center portion and held in contact with the adjacent pin so as to exert opposed forces thereon tending to push the pins away from each other and towards the end of the members.

3. In a gate valve of the type wherein a housing defines a gate valve operating chamber intersected transversely by a fluid flow passageway to define a pair of opposed ports provided with a pair of opposed and parallel planar seats, a ported gate valve assembly linearly movable in said chamber in two opposed directions parallel to said seats through a stroke having a valve sealed open position at one end and a valve sealed closed position at the other, said assembly having an elongated length parallel to the seats and terminating in opposed ends, a pair of opposed planar and parallel sealing surfaces adjacent and parallel to said seats, and a pair of opposed edge surfaces extending between the sealing surfaces and generally normal thereto, said assembly comprising a gate member and a segment member, the gate member being an elongated, generally rectangular block having a planar concavity therein formed by two edge surfaces intersecting in an apex at about midlength of the member, said wedge surfaces being canted with respect to both the lengthwise dimension of the member and its width between said seats, the segment being a complementary block modified to provide a planar convexity likewise having two wedge surfaces intersecting in an apex, said wedge surfaces of the segment being parallel to the wedge surfaces of the gate member, said two members being assembled in nested arrangement with coplanar edge surfaces so that they have one of three different relative positions in sequence, first a stroke position in which their apices are coincident and said pairs of adjacent and interfacing wedge surfaces are both in full contact, this being the collapsed or minimum thickness position of the assembly, secondly an expanded sealing position at one end of the stroke in which the apex of the gate member is displaced lengthwise toward one end of the assembly relative to the apex of the segment and, toward the same end, the adjacent wedge surfaces of the two members are separated by a gap while the other pair are in contact but the wedge surface of the gate member has experienced sliding relative to the touching surface of the segment member, forcing the two members into a laterally expanded position, and thirdly, an expanded position at the other extremity of the stroke which is the mirror image of the second position, said gate valve also including means in the housing to halt the linear movements of the segment member without stopping the gate member and stem means secured to at least one end of the gate member to push or pull the assembly through its strokes and through its movements relative to the segment member after the segment member is stopped, the improvement comprising spring plate means secured between said gate and segment members on one coplanar pair of their opposed edge surfaces and a pair of pins secured in such edge surface of the gate member at equal distances lengthwise from the apex thereof, said spring plate means including a central portion rigidly secured to said segment member at its midlength for common linear movements therewith, a pair of strength spring fingers extending integrally from said center portion in opposed lengthwise directions so that each underlies and contacts one of said projecting pins, and a pair of curved spring fingers extending integrally from said center portion in opposed lengthwise directions, each curved spring finger also curving to point downwardly toward the adjacent straight finger and being flexed in assembly towards said center portion and held in contact with a portion of the adjacent projecting pin facing toward the center portion.

4. The improved gate valve of claim 3 in which said center portion of the spring plate means has a central opening therethrough registering with a like opening in the segment opening disposed above the apex of the segment member, and a connecting member is provided to secure the spring plate means to the segment member.

5. The improved gate valve of claim 3 in which each of said curved spring fingers contacts the adjacent projecting pin at a point in section where a tangent to the pin is approximately normal to the stroke direction of said assembly.

6. The improved gate valve of claim 3 in which each of said straight fingers is slightly flexed in initial assembly to exert a force approximately normal to the stroke direction of the assembly, thereby tending to push said gate member into collapsed relationship with said segment member.

7. The improved gate valve of claim 3 in which each of said straight spring fingers has a modified end portion to avoid contact with the adjacent end of the curved spring finger, said modified end having a larger dimension in that part contacting the projecting pin and a sloping part inwardly thereof in the direction of the central portion, said sloping part being joined to a portion of a smaller dimension measured between the sealing surfaces of the assembly.

8. An improved gate valve as set forth in claim 3, said spring plate means being a spring plate in the general form of an "H" rotated 90 degrees so that one of its two doubly-free-ended legs lies parallel to the lengthwise dimension of the assembly and defines the two straight spring fingers, the crossbar of the configuration is widened in the same direction and extends generally normally between the sealing surfaces of the assembly but stops short of each of them to define said central portion of the spring plate, said central portion extending across the apices of both gate and segment in collapsed position and having a top end and a bottom secured to the segment member at a point directly above its apex in the direction therefrom normal to its sealing surface, and the other of the two doubly-free-ended legs of the configuration are modified to curve toward the adjacent end of the assembly and toward the adjacent straight spring finger.

9. The improved gate valve of claim 3 in which said improvement includes a third pin secured in and projecting from said segment member from a point directly over its apex and normal to its sealing surface, and the spring plate means has an opening of like size through the center of its center portion received on said projecting pin, whereby said center portion is rigidly secured to the segment member for common linear movement therewith.

10. The improved gate valve of claim 3 which is further improved by a second spring plate means secured between said gate and segment members on the other coplanar pair of their opposed edge surfaces, together with a second pair of pins secured in such edge surface of the gate member at equal distance lengthwise from the apex thereof, said second spring plate means having the same parts as the first and being disposed in the same relative position as the first with respect to said pins and the parts of the gate valve assembly.

* * * * *

UNITED STATES PATENT AND TRADEMARK OFFICE
CERTIFICATE OF CORRECTION

PATENT NO. : 4,193,577
DATED : March 18, 1980
INVENTOR(S) : Willard E. Kemp

It is certified that error appears in the above-identified patent and that said Letters Patent are hereby corrected as shown below:

Column 5, line 32, change "direction" to -- directions --.
Column 6, line 38, change "edge" to -- wedge --.
Column 7, line 11, change "strength" to -- straight --.

Signed and Sealed this

Thirty-first Day of March 1981

[SEAL]

Attest:

RENE D. TEGTMEYER

Attesting Officer        Acting Commissioner of Patents and Trademarks